(12) United States Patent
Levy et al.

(10) Patent No.: US 11,475,171 B2
(45) Date of Patent: Oct. 18, 2022

(54) AUTHENTICATION USING PAIRWISE SECRETS CONSTRUCTED FROM PARTIAL SECRETS

(71) Applicant: EMC IP Holding Company LLC, Hopkinton, MA (US)

(72) Inventors: Shoham Levy, Raanana (IL); Yoav Nir, Zikhron Ya'Akov (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 154 days.

(21) Appl. No.: 16/995,100

(22) Filed: Aug. 17, 2020

(65) Prior Publication Data
US 2022/0050932 A1   Feb. 17, 2022

(51) Int. Cl.
| | | |
|---|---|---|
| *G06F 21/45* | (2013.01) |
| *G06F 21/40* | (2013.01) |
| *G06F 21/78* | (2013.01) |
| *G06F 21/60* | (2013.01) |
| *G06F 3/06* | (2006.01) |
| *G06F 21/71* | (2013.01) |

(52) U.S. Cl.
CPC .............. *G06F 21/78* (2013.01); *G06F 3/064* (2013.01); *G06F 3/0622* (2013.01); *G06F 3/0673* (2013.01); *G06F 21/602* (2013.01); *G06F 2221/2103* (2013.01)

(58) Field of Classification Search
None
See application file for complete search history.

(56) References Cited

U.S. PATENT DOCUMENTS

| | | | |
|---|---|---|---|
| 9,430,655 B1* | 8/2016 | Stockton | G06Q 20/3827 |
| 11,341,551 B2* | 5/2022 | McGregor | G06Q 30/0613 |
| 2016/0094540 A1* | 3/2016 | Camenisch | H04L 9/085 |
| | | | 726/8 |
| 2016/0294562 A1* | 10/2016 | Oberheide | H04L 9/0863 |
| 2018/0205743 A1* | 7/2018 | McIver | H04W 12/06 |

OTHER PUBLICATIONS https://en.wikipedia.org/wiki/Challenge-Handshake_Authentication_Protocol.
https://www.cisco.com/c/en/us/support/docs/wan/point-to-point-protocol-ppp/25647-understanding-ppp-chap.html.

* cited by examiner

*Primary Examiner* — Venkat Perungavoor
(74) *Attorney, Agent, or Firm* — Ryan, Mason & Lewis, LLP (57) ABSTRACT

Techniques are provided for authentication using pairwise secrets constructed from partial secrets. One method comprises obtaining, by a first entity of a communication between the first entity and a second entity, partial secrets associated with the first and second entities; generating a constructed secret for the communication by applying a cryptographic function to the partial secrets associated with the first and second entities; and authenticating the communication using the constructed secret. A control entity may assign a substantially unique partial secret to each of multiple first and second entities and distribute at least a subset of the assigned partial secrets to at least some of the first and second entities. A communication between given first and second entities can be authenticated using a pairwise constructed secret for the given communication generated by applying the cryptographic function to the partial secrets associated with the first and second entities.

20 Claims, 7 Drawing Sheets

AUTHENTICATION USING PAIRWISE SECRETS CONSTRUCTED FROM PARTIAL SECRETS

FIELD

The field relates generally to information processing systems, and more particularly to authentication techniques in such systems.

BACKGROUND

Many authentication solutions are based upon a client proving knowledge to another computing device of a secret value, such as a password, a personal identification number or a symmetric key. The Challenge Handshake Authentication Protocol (CHAP), for example, is an identity verification protocol where an authenticator entity sends a challenge message to an entity requesting access (e.g., an initiator of a communication between the two entities). The entity requesting access responds with a value calculated using a "one-way hash" function applied to the challenge and a secret value. The authenticator entity evaluates the response against an expected hash value.

A need exists for improved techniques for authenticating communications.

SUMMARY

In one embodiment, a method comprises obtaining, by at least one processing device of a first entity associated with a communication between the first entity and a second entity, a partial secret associated with the first entity and a partial secret associated with the second entity, wherein the partial secret associated with the first entity and the partial secret associated with the second entity are assigned by a control entity; generating a constructed secret for the communication by applying a cryptographic function to the partial secret associated with the first entity and the partial secret associated with the second entity; and authenticating the communication using the constructed secret.

In some embodiments, the control entity assigns a substantially unique partial secret to each first entity of a plurality of first entities and a substantially unique partial secret to each second entity of a plurality of second entities and distributes at least a subset of the assigned partial secrets to at least a subset of the first entities and to at least a subset of the second entities using a control communication path. A given communication between a given first entity and a given second entity can be authenticated using a pairwise constructed secret for the given communication generated by applying the cryptographic function to the partial secret associated with the given first entity and the partial secret associated with the given second entity.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for authentication using pairwise secrets constructed from partial secrets.

In one or more embodiments of the disclosure, a communication between a first entity and a second entity is authenticated using partial secrets that are associated with each entity and assigned by a control entity. In at least some embodiments of the disclosure, the partial secrets assigned to each entity are known to both entities associated with the given communication. A constructed secret for the communication is generated by at least one of the entities by applying a cryptographic function to the partial secret associated with the first entity and the partial secret associated with the second entity. The communication is then authenticated using the constructed secret.

With at least some existing implementations of the CHAP protocol, a single secret is used for each entity requesting access to connect to all authenticators. With the disclosed techniques for authentication using pairwise secrets, different pairwise secrets are used for each pair of entities. In this manner, a pairwise secret for a given communication is based on a first secret value assigned to a first entity associated with the given communication, such as an authenticator entity, and a second secret value assigned to the second entity associated with the given communication, such as entity requesting access.

While one or more embodiments of the disclosure are illustrated herein using the CHAP protocol in the context of a storage system, the disclosed techniques may be applied to any environment where pairwise secrets can be used to authenticate an entity, as would be apparent to a person of ordinary skill in the art. For example, the disclosed techniques for authentication using pairwise secrets can be employed to authenticate any directory-based communications where a directory service or another control entity distributes control mappings (e.g., identifies peers and other entities) and credentials among devices and then the devices communicate directly. It is noted that CHAP-based authentication is one standard for a storage over IP (internet protocol) medium.

Figure 1:
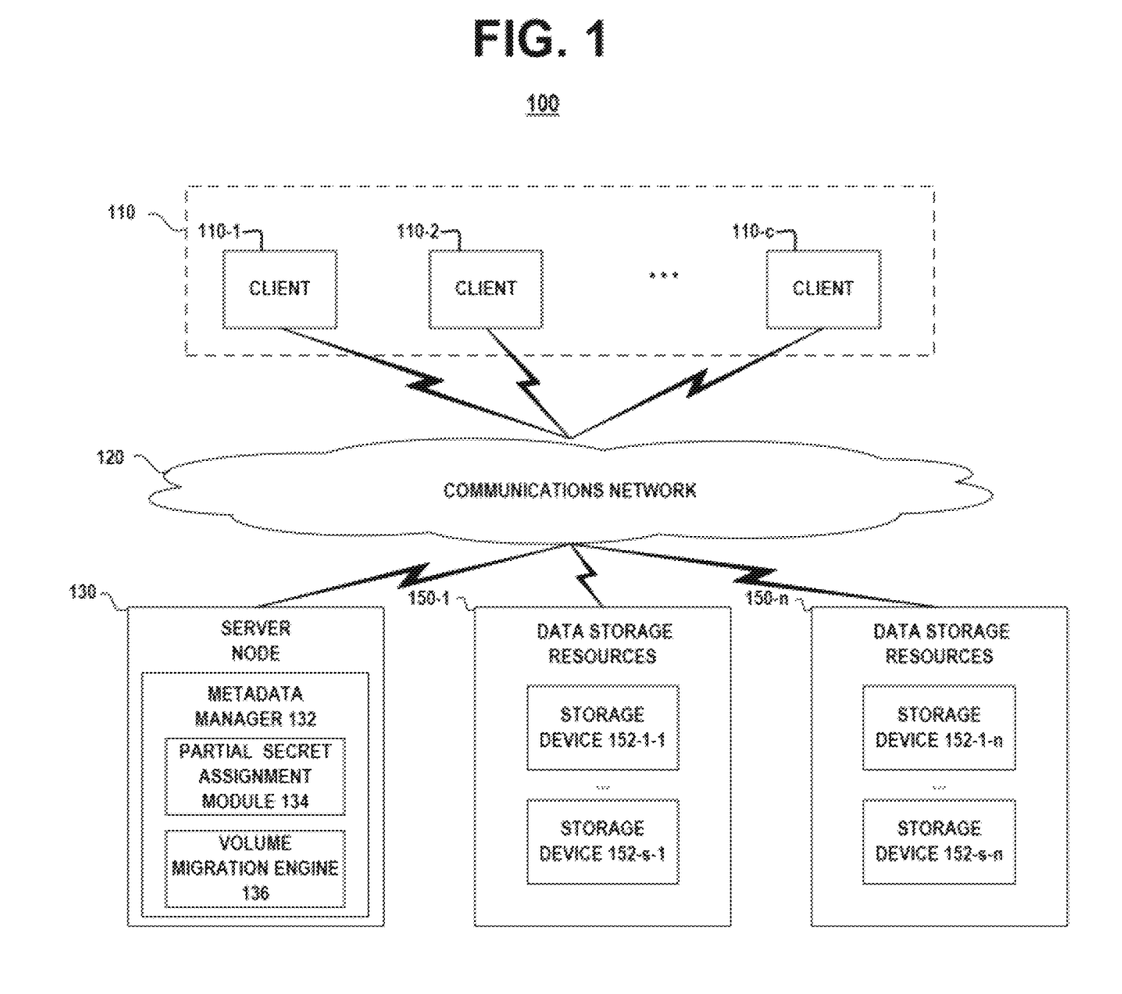
FIG. 1 is a high-level schematic illustration of a computing system comprising a software-defined storage control system that implements a process for authentication using pairwise secrets, according to an exemplary embodiment of the disclosure.

FIG. 1 is a high-level schematic illustration of a computing system comprising a software-defined storage system that implements a process for balancing storage blocks using volume part migration, according to an exemplary embodiment of the disclosure. More specifically, FIG. 1 schematically illustrates a computing system 100 which comprises a plurality of client nodes 110-1, 110-2, . . . , 110-c (collectively referred to as client nodes 110), a communications network 120, one or more server nodes 130 and data storage resources 150-1 through 150-n (collectively referred to as data storage resources 150). One or more server nodes 130 may comprise a software-defined storage control system (not shown in FIG. 1). Each of the data storage resources 150-i comprise a plurality of storage devices 152-1-i through 152-s-i (collectively referred to as storage devices 152).

The client nodes 110 include various types of applications that issue data input/output (I/O) requests to storage volumes. For example, the client nodes 110 include user applications, server applications, database applications, virtual machines and containers. The client nodes 110 can be hosted by, and execute on, various types of computing devices and systems including, but not limited to, desktop computers, laptop computers, workstations, computer servers, enterprise servers, rack servers, smart phones and electronic tablets.

A number of storage systems rely on initiator authentication to enforce volume access permissions. With the CHAP authentication protocol, for example, the initiator holds a secret that is used to authenticate the initiator with target data storage resources 150. One or more embodiments of the disclosure provide techniques for authentication using pairwise secrets constructed from partial secrets.

While the communications network 120 is generically depicted in FIG. 1, it is to be understood that the communications network 120 may comprise any known communication network such as a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. The term "network" as used herein is therefore intended to be broadly construed so as to encompass a wide variety of different network arrangements, including combinations of multiple networks possibly of different types, which enable communication using, e.g., IP or other communication protocols such as Fibre Channel data transfer protocol, and an iSCSI (Internet Small Computer Systems Interface) data transfer protocol, to support storage network connectivity.

In some embodiments, the data storage resources 150 comprise direct-attached storage (DAS) resources (internal and/or external storage resources of the server node 130), wherein the storage devices 152 are virtually pooled into shared block storage by the control system. For example, the storage devices 152 include the same type, or a combination of different types of persistent storage devices (e.g., physical block devices) such as hard disk drives (HDDs), solid-state drives (SSDs) (e.g., flash storage devices), peripheral component interconnect express (PCIe) flash cards, or other types and combinations of non-volatile memory. The data storage resources 150 are directly connected to the server node 130 through, e.g., a host bus adapter, and using suitable protocols such as ATA (AT Attachment), SATA (Serial ATA), eSATA (external Serial ATA), non-volatile memory express (NVMe), SCSI, and SAS. In an exemplary embodiment, the storage devices 152 include both HDD and SSD storage devices. As is known in the art, SSD storage devices provide faster storage performance than HDD devices. While FIG. 1 generally depicts the software-defined storage environment having a single server node 130, it is to be understood that in other embodiments, the system 100 of FIG. 1 can implement a server cluster of two or more server nodes 130 (e.g., hundreds of server nodes), wherein each server node 130 deploys its own control system. In this instance, the control system of each server node converts the local storage resources (e.g., DAS resources) of the server node into block storage and contributes the block storage to the server cluster to implement a server-based storage area network (SAN) (e.g., a virtual SAN), wherein each server node is part of a loosely coupled server cluster which enables "scale-out" of the software-defined storage environment.

In the software-defined storage environment of FIG. 1, for purposes of discussion, the term "node" or "server node" as used herein refers to a single server node (e.g., one server node 130) which comprises physical block devices (e.g., HDD devices and SSD devices). The control system exposes abstractions of block devices (e.g., virtual block devices). For example, a virtual block device can correspond to a volume of a storage pool. Each virtual block device spans across any number of actual physical storage devices, which are referred to herein as "storage pools." For illustrative purposes, it is assumed that each "storage pool" is homogenous in terms of the type of storage devices within the group (e.g., a storage pool can include only HDD devices or SSD devices). In addition, different storage pools can have the same type of storage device, but a different number of storage devices. For example, a first storage pool can include 10 HDDs, a second storage pool can include 100 HDDs, a third storage pool can include 50 SSDs, and a fourth group can include 100 SSDs.

The control system is a component of the software-defined storage environment shown in FIG. 1. In some embodiments, the software-defined storage environment comprises other components such as data clients, which are not specifically shown in FIG. 1. The control system comprises a software layer that is deployed on one or more server nodes 130 and configured to provision, orchestrate and manage the physical data storage resources 150. For example, the control system implements methods that are configured to create and manage storage pools by aggregating capacity from the physical storage devices 152 (e.g., virtual pools of block storage).

The control system supports the virtualization of storage by separating the control and management software from the hardware architecture. The control system is configured to abstract storage access services from the underlying storage hardware to thereby control and manage I/O requests issued by the client nodes 110, as well as to support networking and connectivity. As shown in FIG. 1, the control system is deployed in the data path between the client nodes 110 and the physical data storage resources 150, and is configured to respond to data I/O requests from the client nodes 110 by accessing the data storage resources 150 to store/retrieve data to/from the storage devices 152 based on the I/O requests.

As shown in FIG. 1, the server node 130 comprises a metadata manager 132 that manages the computing system 100. The metadata manager 132 comprises the metadata required for system operation, such as configuration changes. In one or more embodiments, the metadata manager 132 manages the metadata, the SDCs, computing system 100, device mappings, volumes, snapshots, system capacity (e.g., device allocations and/or release of capacity), RAID protection, errors and failures, and/or system rebuild tasks (including rebalancing). In addition, user interactions with the computing system 100 are handled by the metadata manager 132 in some embodiments. In a normal I/O flow, for example, the metadata manager 132 is not part of the data path and user data does not pass through the metadata manager 132. Therefore, the metadata manager 132 is not a performance bottleneck for I/O operations.

The exemplary metadata manager 132 also comprises a partial secret assignment module 134 and a volume migration engine 136. In some embodiments, the exemplary partial secret assignment module 134 implements a process in accordance with FIG. 4.

Figure 2:
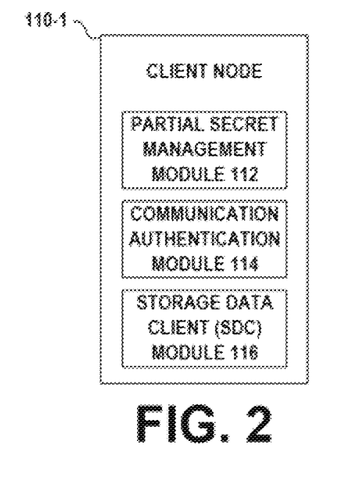
FIG. 2 illustrates an exemplary client node of FIG. 1, in further detail, according to some embodiments.

On the client-side, a storage data client (SDC), as discussed further below in conjunction with FIG. 2, is deployed in each host application server which hosts one or more of the client nodes 110 that require access to the block devices exposed and managed by the control system. The SDC exposes block devices representing the virtual storage volumes that are currently mapped to that host. In particular, the SDC serves as a block driver for a client (server) to access the block storage that is managed by the control system. The SDC provides the operating system or hypervisor (which runs the SDC) access to the logical block devices (e.g., volumes). The SDCs have knowledge of which control systems (e.g., control system) hold its block data, so multipathing can be accomplished natively through the SDCs. The metadata managers 132 manage SDC to control system data mappings.

It is to be appreciated that this particular arrangement of elements 134, 136 illustrated in the metadata manager 132 of the FIG. 1 embodiment is presented by way of example only, and alternative arrangements can be used in other embodiments. For example, the functionality associated with elements 134, 136 in other embodiments can be combined into a single module, or separated across a larger number of modules. As another example, multiple distinct processors can be used to implement different ones of elements 134, 136 or portions thereof.

At least portions of one or more of the elements 134, 136 may be implemented at least in part in the form of software that is stored in memory and executed by a processor.

As noted above, computing system 100 comprises a software-defined storage system that implements the disclosed techniques for balancing storage blocks using volume part migration. In one exemplary implementation, the software-defined storage system may be implemented using the Dell EMC ScaleIO® software-defined storage product, commercially available from Dell EMC of Hopkinton, Mass. The Dell EMC ScaleIO™ software-defined storage product is also known as the VxFlex OS® software-defined storage product and/or the PowerFlex OS® software-defined storage product.

FIG. 2 illustrates an exemplary client node 110-1 of FIG. 1, in further detail, according to some embodiments. As shown in FIG. 2, the client node 110-1 comprises a partial secret management module 112, a communication authentication module 114 and an SDC module 116. Generally, the partial secret management module 112 communicates with the metadata manager 132 to receive its own partial secret, as well as the partial secrets of the target storage devices that the client node 110-1 interacts with, using a partial key generation and distribution process discussed further below in conjunction with FIG. 4. In addition, the exemplary communication authentication module 114 communicates with a desired target storage device using an authentication process discussed further below in conjunction with FIG. 5.

Figure 3:
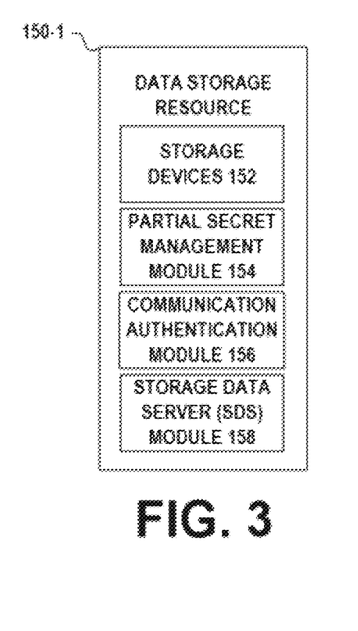
FIG. 3 illustrates an exemplary data storage resource of FIG. 1, in further detail, according to at least one embodiment.

The SDC module 116 is an initiator on the client node 110-1 for write operations to storage volumes and to read from storage volumes, where a given storage data server (SDS), as discussed further below in conjunction with FIG. 3, is the I/O target. As noted above, storage volumes are spread across the SDSs. It is to be appreciated that this particular arrangement of modules 112, 114, 116 illustrated in the client node 110-1 of the FIG. 2 embodiment is presented by way of example only, and alternative arrangements can be used in other embodiments. For example, the functionality associated with modules 112, 114, 116 in other embodiments can be combined into a single module, or separated across a larger number of modules. As another example, multiple distinct processors can be used to implement different ones of modules 112, 114, 116 or portions thereof.

At least portions of one or more of the modules 112, 114, 116 may be implemented at least in part in the form of software that is stored in memory and executed by a processor.

FIG. 3 illustrates an exemplary data storage resource 150-1 of FIG. 1, in further detail, according to at least one embodiment. As shown in FIG. 3, the exemplary data storage resource 150-1 comprises a plurality of storage devices 152, discussed above, a partial secret management module 154, a communication authentication module 156 and an SDS module 158. Generally, the partial secret management module 154 communicates with the metadata manager 132 to receive its own partial secret, as well as the partial secrets of the client nodes 110 that the particular SDS interacts with, using a partial key generation and distribution process discussed further below in conjunction with FIG. 4. In addition, the exemplary communication authentication module 156 communicates with a given client node 110 using an authentication process discussed further below in conjunction with FIG. 5.

As noted above, a given SDS is a target for I/O operations initiated by a given client node 110. In addition, a given SDS serves a portion of a given storage volume. For example, if there are 50 data storage resources 150-1 in the computing system 100, each data storage resource 150-1 has multiple (potentially hidden) storage devices 152 and a portion of a storage volume desired by a given client node 110. The portion of the storage volume stored by each SDS does not need to be the same size for all SDS (e.g., some SDSs can store more than $\frac{1}{50}^{th}$ of a storage volume and some SDSs can store less than $\frac{1}{50}^{th}$ of a storage volume). In addition, the portion of storage volume that resides on a single SDS does not need to be consecutive (e.g., an SDS can carry several non-consecutive spans of the virtual volume; eventually, however, all volume spans, on all hosted SDSs, sum up to the full virtual volume space). It is noted that volume space does not need to be physically allocated on the SDS, and can be virtually assigned. In addition, a given SDS will consume the assigned volume space if, and when, the user actually starts using the volume space by writing to the volume space. It is to be appreciated that this particular arrangement of modules 154, 156, 158 illustrated in the data storage resource 150-1 of the FIG. 3 embodiment is presented by way of example only, and alternative arrangements can be used in other embodiments. For example, the functionality associated with modules 154, 156, 158 in other embodiments can be combined into a single module, or separated across a larger number of modules. As another example, multiple distinct processors can be used to implement different ones of modules 154, 156, 158 or portions thereof.

At least portions of one or more of the modules 154, 156, 158 may be implemented at least in part in the form of software that is stored in memory and executed by a processor.

Figure 4:
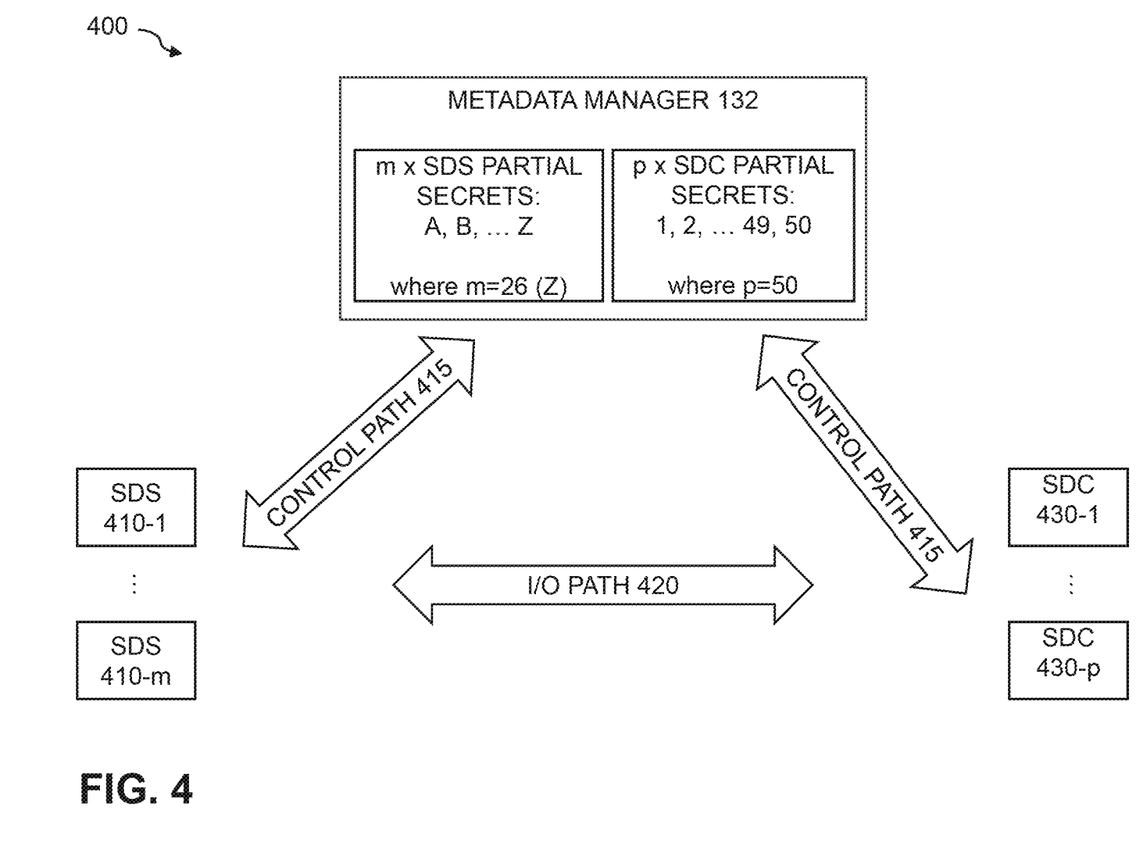
FIG. 4 illustrates an exemplary process for the generation and distribution of partial keys by the metadata manager of FIG. 1, according to one or more embodiments of the disclosure.

FIG. 4 illustrates an exemplary process 400 for the generation and distribution of partial keys by the metadata manager 132 of FIG. 1, according to one or more embodiments of the disclosure. As shown in FIG. 4, a plurality of SDSs 410-1 through 410-$m$ and a plurality of SDCs 430-1 through 430-$p$ interact with the metadata manager 132, using a control path 415 in the example of FIG. 4, to obtain partial keys.

Generally, in some embodiments, after the initiator (e.g., SDC 430) connects to the metadata manager 132, the initiator gets a set of unique partial secrets. The unique partial secrets can be recreated and distributed by the metadata manager 132 to SDSs 410 (target devices) and SDCs 430 (initiators). Thus, in one or more embodiments, the partial secrets do not need to be persisted by the metadata manager 132, SDS 410 or SDC 430 entities and can be frequently changed. Thus, if a given SDC 430, for example, stops operating, the given SDC 430 must communicate again with the metadata manager 132 using the process 400 to obtain the needed partial secrets.

In the example of FIG. 4, there are m=26 SDSs 410 (target devices), each having a corresponding partial secret A-Z, and p=50 SDCs 430 (initiators), each having a corresponding partial secret 1-50. The metadata manager 132 generates a set of unique partial secrets, with one partial secret for each of the m SDSs 410, denoted as partial secrets A-Z in FIG. 4, and one partial secret for each SDC 430 (e.g., m+p partial secrets). In at least some embodiments, the partial secrets are stored only in the RAM of the active control process. In one or more embodiments, the partial secrets are encrypted before being sent to the SDSs 410 and SDCs 430, for example, using Transport Layer Security (TLS) encryption. In another variation, the partial secrets are encrypted before being sent to the SDSs 410 and SDCs 430 using a key derived from the CHAP secrets during runtime. In this manner, the partial secrets are not sent in an unencrypted format (e.g., using clear text).

Each SDS 410 receives its own unique partial secret (e.g., a partial key), as well as a partial secret for each of the SDCs 430 that a given SDS 410 interacts with. Likewise, each SDC 430 receives its own unique partial secret, as well as a partial secret for each of the SDSs 410 that a given SDC 430 interacts with.

In one or more embodiments, the exemplary process 400 for the generation and distribution of partial secrets may be triggered, for example, when an SDC 430 (initiator) connects to the computing system 100. A connection to the metadata manager 132 is established, for example, using a CHAP secret or TLS authentication. In at least some embodiments, the security level of the disclosed techniques for authentication using pairwise secrets constructed from partial secrets are influenced by the security level of the initial connection with the metadata manager 132. Although TLS is often considered more modern and robust, many existing storage drivers use the CHAP protocol. One or more SDSs 410 and one or more SDCs 430 communicate using an I/O path 420, as discussed further below.

Figure 5:
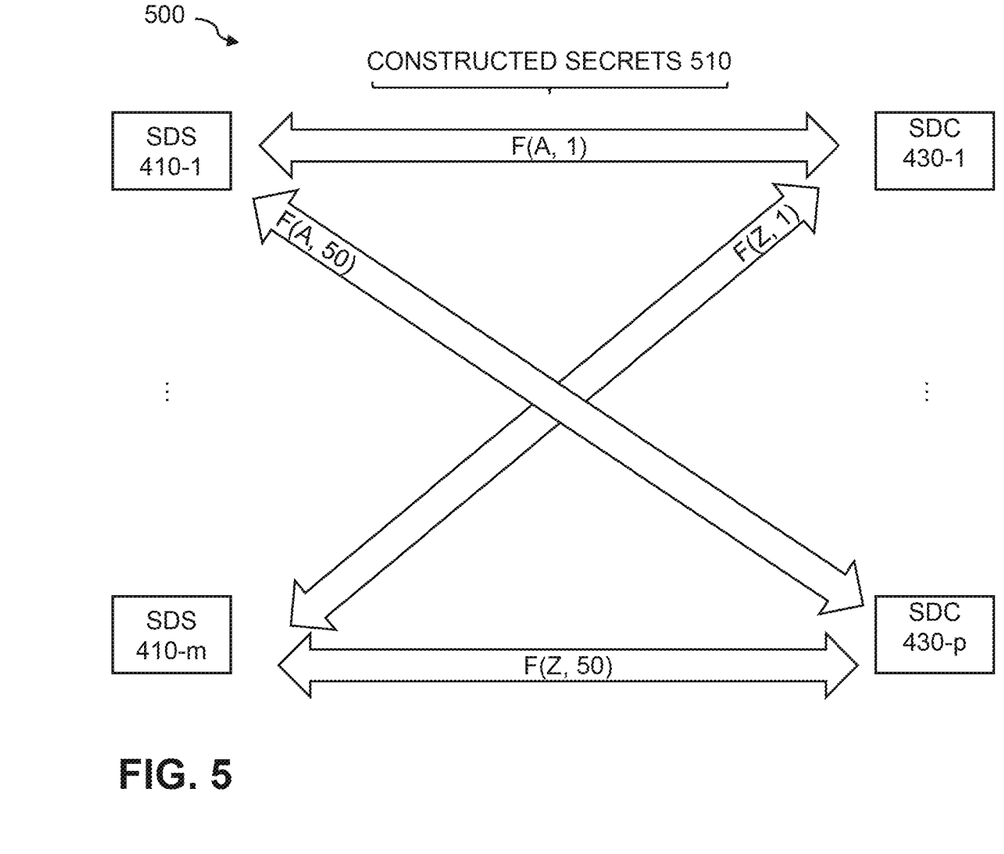
FIG. 5 illustrates an exemplary process for the generation of pairwise constructed secrets between two entities using the partial secrets of FIG. 4, according to at least one embodiment.

FIG. 5 illustrates an exemplary process 500 for the generation of pairwise constructed secrets 510 between a given SDS 410 and a given SDC 430 using the partial secrets of FIG. 4, according to at least one embodiment. As shown in FIG. 5, the pairwise constructed secret 510 between a given SDS 410, such as SDS 410-1, and a given SDC 430, such as SDC 430-1, is constructed by applying a cryptographic function, such as a non-reversible asymmetric function (e.g., hashing the concatenation of the partial secrets), to the partial secret (A) of the SDS 410-1 and the partial secret (1) of the SDC 430-1. Similarly, the pairwise constructed secret 510 between a given SDS 410-$m$ and a given SDC 430-$p$ is constructed by applying the cryptographic function to the partial secret (Z) of the SDS 410-$m$ and the partial secret (50) of the SDC 430-$p$.

In this manner, the constructed secrets 510 used for access are generated from the respective partial secrets of the two parties to a communication, using, for example, an asymmetric function, so that partial secrets cannot be inferred. In this manner, an infiltrator cannot expose more than one constructed secret 510.

In further variations, the constructed secret 510 can be generated using HMAC (hash-based message authentication code) with one partial secret serving as the key, or a KDF (key derivation function), such as HKDF (a KDF based on an HMAC), with one of the partial secrets serving as the key. Thus, if a given constructed secret 510 is intercepted, the secret reveals nothing about the two partial secrets, and changing either partial secret invalidates a potential attack.

As discussed further below in conjunction with FIG. 6, once the SDC 430 (initiator) creates the full constructed secret 510, the communication proceeds using the CHAP protocol (with the disclosed partial secret techniques improving the CHAP security), for example, using the I/O path 420 of FIG. 4.

Since the SDSs 410 and SDCs 430 construct the constructed secret 510, the computational load on the metadata manager 132 is reduced, since the metadata manager 132 only needs to create and distribute m+p partial secrets (and not m*p full (e.g., constructed) secrets).

Figure 6:
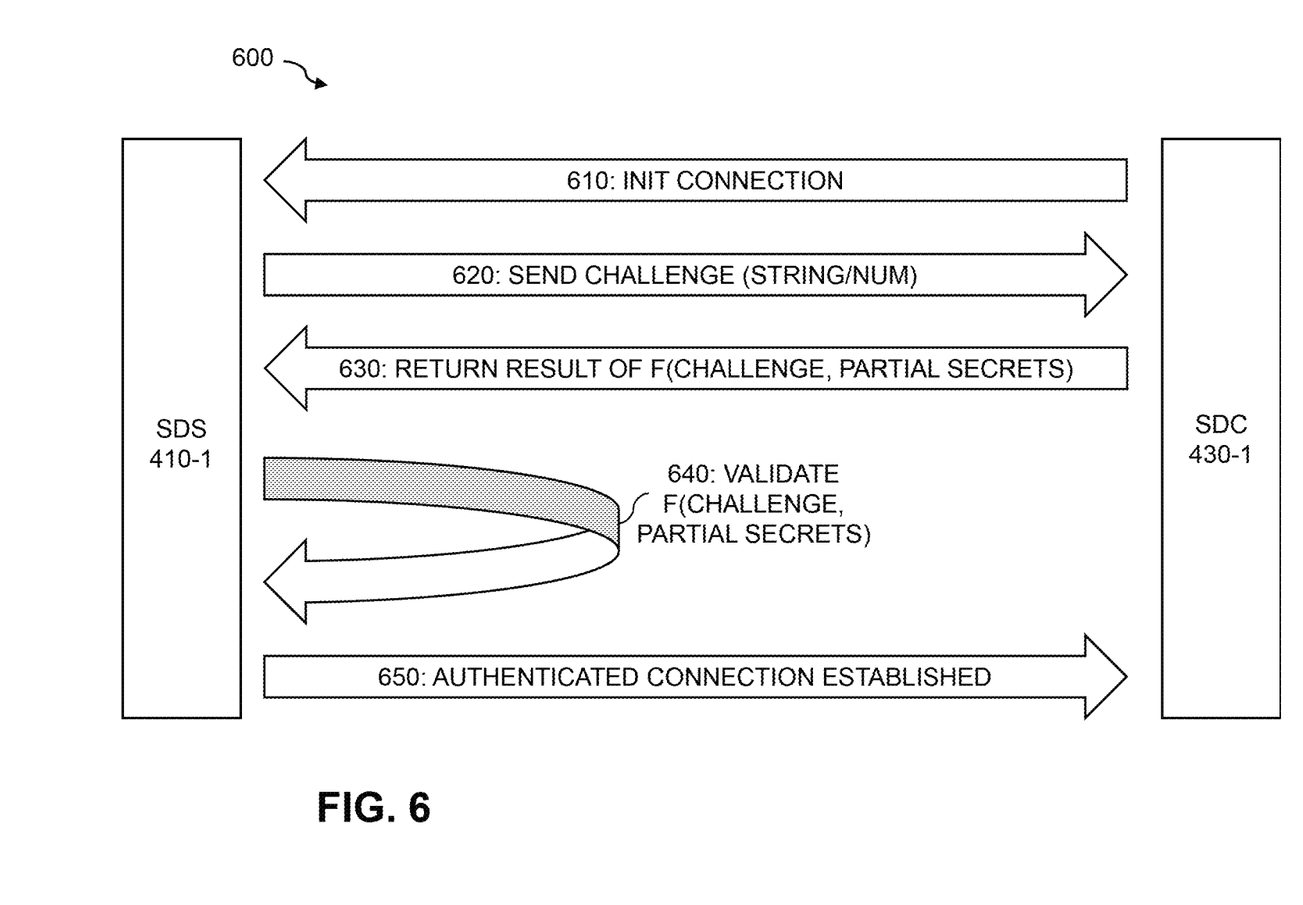
FIG. 6 is a communication diagram illustrating a challenge handshake authentication process employed between two entities, according to an embodiment of the disclosure.

FIG. 6 is a communication diagram illustrating a challenge handshake authentication process 600 employed between a given SDS 410 and a given SDC 430, according to an embodiment of the disclosure. As shown in FIG. 6, a given SDC, such as SDC 430-1 attempts to initiate a connection with a target device (e.g., SDS-1) during step 610. SDS-1 then sends a challenge to SDC 430-1 during step 620, such as a string or a number (or a combination thereof).

SDC 430-1 generates the constructed secret for the communication by applying the cryptographic function to the challenge and the partial secrets of the SDC 430-1 and the SDS 410-1. SDC 430-1 responds to the challenge during step 630 by returning the constructed secret to SDS 410-1.

During step 640, SDS 410-1 validates the received constructed secret by also applying the cryptographic function to the challenge and the partial secrets of the SDC 430-1 and the SDS 410-1 and comparing the result to the received constructed secret value. If the two constructed secrets match, an authenticated communication is established during step 650. The SDC 430-1 may be optionally re-challenged during the authenticated communication.

Figure 7:
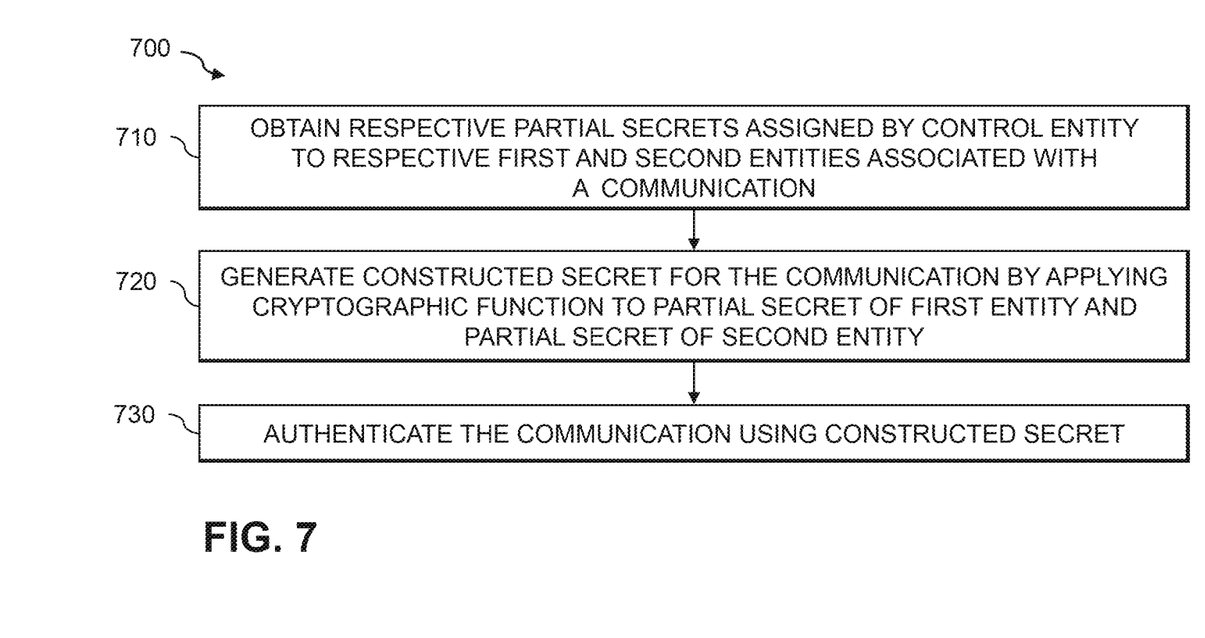
FIG. 7 is a flow chart illustrating an exemplary implementation of an authentication process using pairwise secrets constructed from partial secrets, according to one embodiment of the disclosure.

FIG. 7 is a flow chart illustrating an exemplary implementation of an authentication process 700 using pairwise secrets constructed from partial secrets, according to one embodiment of the disclosure. As shown in FIG. 7, during step 710, the exemplary authentication process 700 initially obtains respective partial secrets assigned by a control entity, such as the metadata manager 132, to respective first and second entities associated with a given communication. The first and second entities may comprise, for example, a given SDS 410 and a given SDC 430.

The exemplary authentication process 700 then generates a constructed secret for the communication during step 720 by applying a cryptographic function to the partial secret of the first entity and the partial secret of the second entity. Finally, during step 730, the exemplary authentication process 700 authenticates the communication using the constructed secret. For example, if the constructed secret sent by the first entity matches the constructed secret generated by the second entity, the communication can be authenticated. If the two constructed secrets match, an authenticated communication can be established, and the communications continue, for example, using the CHAP protocol.

The particular processing operations and other network functionality described in conjunction with the flow diagram of FIG. 7, for example, are presented by way of illustrative example only, and should not be construed as limiting the scope of the disclosure in any way. Alternative embodiments can use other types of processing operations to implement authentication using pairwise secrets constructed from partial secrets with the disclosed techniques. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In some embodiments, the above-described techniques for authentication using pairwise secrets based on two partial secrets can be extended to include additional partial secrets (e.g., triplet secrets and/or quadruplet secrets) for: (i) two or more paths between at least a subset of the first entities and at least a subset of the second entities, (ii) each storage volume for all of the second entities serving the same storage volume, and/or (iii) each storage volume on a specific second entity.

In one or more embodiments, the disclosed techniques for authentication using pairwise secrets constructed from partial secrets enhance the existing CHAP security scheme by reducing the chances of an eavesdropper to access target devices, and by reducing the attack surface of the storage system, without putting significant memory and computational strains on the control entity, such as the metadata manager 132. For example, the attack surface can be reduced by: not passing the constructed secrets between the communicating entities, by not storing the partial secrets or the constructed secret in persistent memory, and by more easily changing the partial secrets at a high frequency.

Current storage systems, on the other hand, rely on CHAP secrets for initiator authentication. The constructed secret is unique for each initiator (e.g., first entity) and is persisted both on the initiator side (with the configuration information) and in a database of the storage controller. It is difficult to recreate CHAP secrets and replace them in the initiator devices, so it is seldom done. CHAP has a two-way authentication mechanism, but it is used just for the initiator to also identify the target device (as opposed to just the target identifying the initiator).

Further, with existing implementations of the CHAP protocol, a control entity must generate N*T pairwise secrets, where N is the number of authenticator entities and T is the number of entities requesting access. With the disclosed techniques for authentication using pairwise secrets constructed from partial secrets, the control entity can create just N+T secrets and spread them to the components. This reduces the calculation time for the control entity and reduces the memory size needed to store the secrets. In turn, frequent replacement of all partial secrets is enabled in the system, thus reducing the attack surface even more. In addition, a failure of the control entity can be handled by recreating of the partial secrets, and there is no need to persist them, or pass them among standby controllers.

Figure 8:
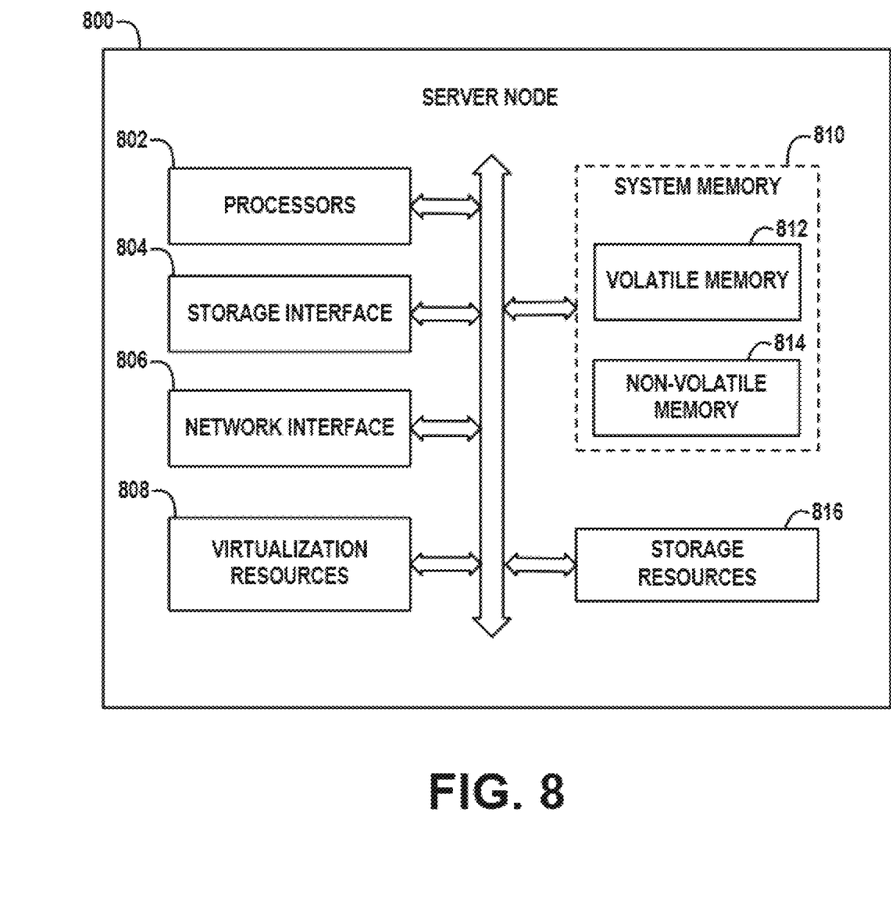
FIG. 8 schematically illustrates framework of a server node which can be implemented in the system of FIG. 1 for hosting a software-defined storage system, according to an exemplary embodiment of the disclosure.

FIG. 8 schematically illustrates a framework of a server node 800 that can be implemented in the system 100 of FIG. 1 for hosting a software-defined storage control system, according to an exemplary embodiment of the disclosure. In particular, FIG. 8 schematically illustrates an exemplary hardware architecture of the server node 130 of FIG. 1, which can host entities of the control system of FIG. 1. The server node 800 comprises processors 802, storage interface circuitry 804, network interface circuitry 806, virtualization resources 808, system memory 810, and storage resources 816. The system memory 810 comprises volatile memory 812 and non-volatile memory 814.

The processors 802 comprise one or more types of hardware processors that are configured to process program instructions and data to execute a native operating system (OS) and applications that run on the server node 800. For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware and/or firmware. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, Serial Attached SCSI (SAS), and Fibre Channel. The network interface circuitry 806 enables the server node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, and converged Ethernet adaptors) to support communication protocols and interfaces including, but not limited to, PCIe, DMA and RDMA data transfer protocols.

The virtualization resources 808 can be instantiated to execute one or more services or functions which are hosted by the server node 800. For example, the virtualization resources 808 can be configured to implement the various modules and functionalities of the control systems of FIG. 1, as discussed herein. In one embodiment, the virtualization resources 808 comprise virtual machines that are implemented using a hypervisor platform which executes on the server node 800, wherein one or more virtual machines can be instantiated to execute functions of the server node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 800 as well as execute one or more of the various modules and functionalities of the control systems of FIG. 1, as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various software modules of the control systems and the storage block balancing modules that employ authentication using pairwise secrets constructed from partial secrets comprise program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of a NAND Flash storage device, an SSD device, or other types of next generation non-volatile memory (NGNVM) devices. The system memory 810 can be implemented using a hierarchical memory tier structure wherein the volatile memory 812 is configured as the highest-level memory tier, and the non-volatile memory 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 802 to execute a native operating system and one or more applications or processes hosted by the server node 800, and to temporarily store data that is utilized and/or generated by the native OS and application programs and processes running on the server node 800. The storage resources 816 can include, for example, one or more HDDs and/or SSD storage devices.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   obtaining a partial secret associated with a first entity associated with a communication between the first entity and a second entity and a partial secret associated with the second entity, wherein the partial secret associated with the first entity and the partial secret associated with the second entity are assigned by a control entity;
   generating a constructed secret for the communication by applying a cryptographic function to the partial secret associated with the first entity and the partial secret associated with the second entity; and
   authenticating the communication using the constructed secret,
   wherein the method is performed by at least one processing device of the first entity, said at least one processing device comprising a processor coupled to a memory.

2. The method of claim 1, wherein the first entity comprises a storage data server and wherein the second entity comprises a storage data client in a block storage system.

3. The method of claim 1, wherein the control entity assigns a substantially unique partial secret to each first entity of a plurality of first entities and a substantially unique partial secret to each second entity of a plurality of second entities and distributes at least a subset of the assigned partial secrets to at least a subset of the first entities and to at least a subset of the second entities using a control communication path.

4. The method of claim 3, wherein a given communication between a given first entity and a given second entity is authenticated using a pairwise constructed secret for the given communication generated by applying the cryptographic function to the partial secret associated with the given first entity and the partial secret associated with the given second entity.

5. The method of claim 3, wherein the control entity further assigns a substantially unique partial secret to one or more of (i) two or more paths between at least a subset of the first entities and at least a subset of the second entities, (ii) each at least a portion of a given storage volume for the plurality of second entities serving at least a portion of the same given storage volume, and (iii) each at least a portion of plurality of storage volumes on a specific second entity.

6. The method of claim 3, further comprising recovering from a failure of the control entity by generating the substantially unique partial secrets of at least a portion of the first entities and the substantially unique partial secrets of at least a portion of the second entities.

7. The method of claim 1, wherein the authenticating the communication using the constructed secret further comprises using a challenge value provided by the first entity to the second entity.

8. The method of claim 1, wherein the authenticating the communication further comprises using a challenge handshake authentication protocol.

9. The method of claim 1, wherein the partial secret associated with the first entity is stored only in a volatile memory of the first entity and the partial secret associated with the second entity is stored only in a volatile memory of the second entity.

10. The method of claim 1, wherein the constructed secret for the communication is not sent between the first entity and the second entity.

11. An apparatus comprising:
at least one processing device of a first entity associated with a communication between the first entity and a second entity, wherein the at least one processing device comprises a processor coupled to a memory;
the at least one processing device being configured to implement the following steps:
obtaining a partial secret associated with the first entity and a partial secret associated with the second entity, wherein the partial secret associated with the first entity and the partial secret associated with the second entity are assigned by a control entity;
generating a constructed secret for the communication by applying a cryptographic function to the partial secret associated with the first entity and the partial secret associated with the second entity; and
authenticating the communication using the constructed secret.

12. The apparatus of claim 11, wherein the first entity comprises a storage data server and wherein the second entity comprises a storage data client in a block storage system.

13. The apparatus of claim 11, wherein the control entity assigns a substantially unique partial secret to each first entity of a plurality of first entities and a substantially unique partial secret to each second entity of a plurality of second entities and distributes at least a subset of the assigned partial secrets to at least a subset of the first entities and to at least a subset of the second entities using a control communication path.

14. The apparatus of claim 13, wherein a given communication between a given first entity and a given second entity is authenticated using a pairwise constructed secret for the given communication generated by applying the cryptographic function to the partial secret associated with the given first entity and the partial secret associated with the given second entity.

15. The apparatus of claim 13, further comprising recovering from a failure of the control entity by generating the substantially unique partial secrets of at least a portion of the first entities and the substantially unique partial secrets of at least a portion of the second entities.

16. The apparatus of claim 11, wherein the authenticating the communication using the constructed secret further comprises using a challenge value provided by the first entity to the second entity.

17. A non-transitory processor-readable storage medium having stored therein program code of one or more software programs, wherein the program code, when executed by at least one processing device of a first entity associated with a communication between the first entity and a second entity, causes the at least one processing device to perform the following steps:
obtaining a partial secret associated with the first entity and a partial secret associated with the second entity, wherein the partial secret associated with the first entity and the partial secret associated with the second entity are assigned by a control entity;
generating a constructed secret for the communication by applying a cryptographic function to the partial secret associated with the first entity and the partial secret associated with the second entity; and
authenticating the communication using the constructed secret.

18. The non-transitory processor-readable storage medium of claim 17, wherein the control entity assigns a substantially unique partial secret to each first entity of a plurality of first entities and a substantially unique partial secret to each second entity of a plurality of second entities and distributes at least a subset of the assigned partial secrets to at least a subset of the first entities and to at least a subset of the second entities using a control communication path.

19. The non-transitory processor-readable storage medium of claim 18, wherein a given communication between a given first entity and a given second entity is authenticated using a pairwise constructed secret for the given communication generated by applying the cryptographic function to the partial secret associated with the given first entity and the partial secret associated with the given second entity.

20. The non-transitory processor-readable storage medium of claim 18, further comprising recovering from a failure of the control entity by generating the substantially unique partial secrets of at least a portion of the first entities and the substantially unique partial secrets of at least a portion of the second entities.

* * * * *